(12) United States Patent
Ng

(10) Patent No.: US 10,348,907 B1
(45) Date of Patent: Jul. 9, 2019

(54) COLLABORATIVE DATA PROCESSING

(71) Applicant: Antony P. Ng, Austin, TX (US)

(72) Inventor: Antony P. Ng, Austin, TX (US)

( * ) Notice: Subject to any disclaimer, the term of this patent is extended or adjusted under 35 U.S.C. 154(b) by 71 days.

(21) Appl. No.: 15/594,350

(22) Filed: May 12, 2017

Related U.S. Application Data

(60) Provisional application No. 62/335,528, filed on May 12, 2016.

(51) Int. Cl.
| | |
|---|---|
| *H04L 12/26* | (2006.01) |
| *H04M 3/56* | (2006.01) |
| *H04W 4/20* | (2018.01) |
| *H04L 12/58* | (2006.01) |
| *G10L 15/26* | (2006.01) |
| *G11B 20/10* | (2006.01) |
| *H04L 29/06* | (2006.01) |

(52) U.S. Cl.
CPC .......... *H04M 3/567* (2013.01); *G10L 15/26* (2013.01); *G11B 20/10527* (2013.01); *H04L 51/10* (2013.01); *H04W 4/203* (2013.01); *G11B 2020/10537* (2013.01); *H04L 69/28* (2013.01)

(58) Field of Classification Search
CPC ....... H04L 65/60; H04L 65/403; H04L 29/06; H04L 21/00; G10H 1/0025; G06F 17/21; G06F 17/211; G06F 3/0484; H04N 9/74; H04N 7/15; H04N 5/45; H04N 5/44591; H04N 5/93; H04M 3/567; G10L 15/26; G11B 20/10527; G04L 51/10; H04W 4/203

USPC .................. 370/265, 535–545; 348/565, 584
See application file for complete search history.

(56) References Cited

U.S. PATENT DOCUMENTS

| | | | | |
|---|---|---|---|---|
| 4,463,389 | A * | 7/1984 | Golding ........... | G11B 20/00007 360/8 |
| 4,768,106 | A * | 8/1988 | Ito ...................... | G11B 5/00865 360/13 |
| 4,775,901 | A * | 10/1988 | Nakano .................... | G11B 5/86 360/60 |
| 6,295,342 | B1 * | 9/2001 | Kaminsky ............. | H04M 3/493 379/67.1 |
| 6,728,174 | B1 * | 4/2004 | Sako ...................... | G11B 7/005 369/47.1 |
| 6,876,617 | B1 * | 4/2005 | Huma .................. | G11B 7/0079 369/59.21 |

(Continued)

*Primary Examiner* — Thai D Hoang
(74) *Attorney, Agent, or Firm* — Russell Ng PLLC; Antony P. Ng

(57) ABSTRACT

A mobile device for electronic document collaboration is disclosed. The mobile device includes a display, a processor and a storage device. The mobile device presents a first message to prompt a first user to start recording on the mobile device in order to capture at least one of audio and video information on the mobile device. After the first user has completed the recording on the mobile device, the mobile device then presents a second message to prompt a second user to start recording on the mobile device to capture at least one of audio and video information on the mobile device. The processor determines whether or not the two recordings were performed within a predetermined time interval. If the two recordings were performed within a predetermined time interval, the processor merges the two recordings into one media document, and the media document is then stored within the storage device.

16 Claims, 5 Drawing Sheets

(56) References Cited

U.S. PATENT DOCUMENTS

| | | | | |
|---|---|---|---|---|
| 8,520,055 B2* | 8/2013 | Sasaki | G11B 20/10527 | 348/42 |
| 8,613,031 B2* | 12/2013 | McMurtrie | H04N 7/17318 | 709/219 |
| 2002/0037161 A1* | 3/2002 | Sugahara | G11B 20/10527 | 386/295 |
| 2002/0095543 A1* | 7/2002 | Shioda | G11B 20/00173 | 711/1 |
| 2003/0184679 A1* | 10/2003 | Meehan | H04N 5/76 | 348/565 |
| 2005/0013583 A1* | 1/2005 | Itoh | G11B 20/10527 | 386/235 |
| 2007/0202881 A1* | 8/2007 | Dervan | G06Q 30/02 | 455/450 |
| 2008/0170130 A1* | 7/2008 | Ollila | H04N 5/2252 | 348/211.99 |
| 2011/0161074 A1* | 6/2011 | Pance | G10L 21/028 | 704/201 |
| 2012/0040644 A1* | 2/2012 | Naik | H04M 1/72522 | 455/412.1 |
| 2012/0066188 A1* | 3/2012 | Teshiba | G11B 20/00007 | 707/693 |
| 2012/0206566 A1* | 8/2012 | Fedoseyeva | G06Q 10/06398 | 348/38 |
| 2012/0308209 A1* | 12/2012 | Zaletel | G11B 27/034 | 386/278 |
| 2013/0212521 A1* | 8/2013 | Fedoseyeva | G06Q 10/00 | 715/781 |
| 2014/0006914 A1* | 1/2014 | Visconsi | G06F 16/438 | 715/202 |
| 2014/0012587 A1* | 1/2014 | Park | H04W 12/06 | 704/275 |
| 2014/0366709 A1* | 12/2014 | Uemura | G10H 1/0025 | 84/603 |
| 2015/0082364 A1* | 3/2015 | Jayaram | H04N 21/4622 | 725/109 |
| 2015/0127782 A1* | 5/2015 | Qin | H04M 3/567 | 709/219 |
| 2015/0286875 A1* | 10/2015 | Land | H04N 19/46 | 382/103 |
| 2016/0065880 A1* | 3/2016 | Pearson | H04N 5/45 | 348/14.07 |
| 2018/0091708 A1* | 3/2018 | Riddiford | G03B 17/02 | |
| 2018/0131732 A1* | 5/2018 | Aronoff | G06Q 10/107 | |
| 2018/0218201 A1* | 8/2018 | Siminoff | G06K 9/00288 | |

* cited by examiner

US 10,348,907 B1

COLLABORATIVE DATA PROCESSING

PRIORITY CLAIM

The present application claims priority under 35 U.S.C. § 119(e)(1) to provisional application No. 62/335,528, filed on May 12, 2016, the contents of which are incorporated herein by reference.

TECHNICAL FIELD

The present invention relates to data processing and communications.

BACKGROUND

Quite often, it is advantageous for multiple users to collaborate on an electronic document. The present disclosure provides a platform for document collaboration by multiple users.

SUMMARY OF THE INVENTION

In accordance with a preferred embodiment of the present invention, a mobile device includes a display, a processor and a storage device. The mobile device presents a first message to prompt a first user to start recording on the mobile device in order to capture at least one of audio and video information on the mobile device. After the first user has completed the recording on the mobile device, the mobile device then presents a second message to prompt a second user to start recording on the mobile device to capture at least one of audio and video information on the mobile device. The processor determines whether or not the two recordings were performed within a predetermined time interval. If the two recordings were performed within a predetermined time interval, the processor merges the two recordings into one media document, and the media document is then stored within the storage device.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
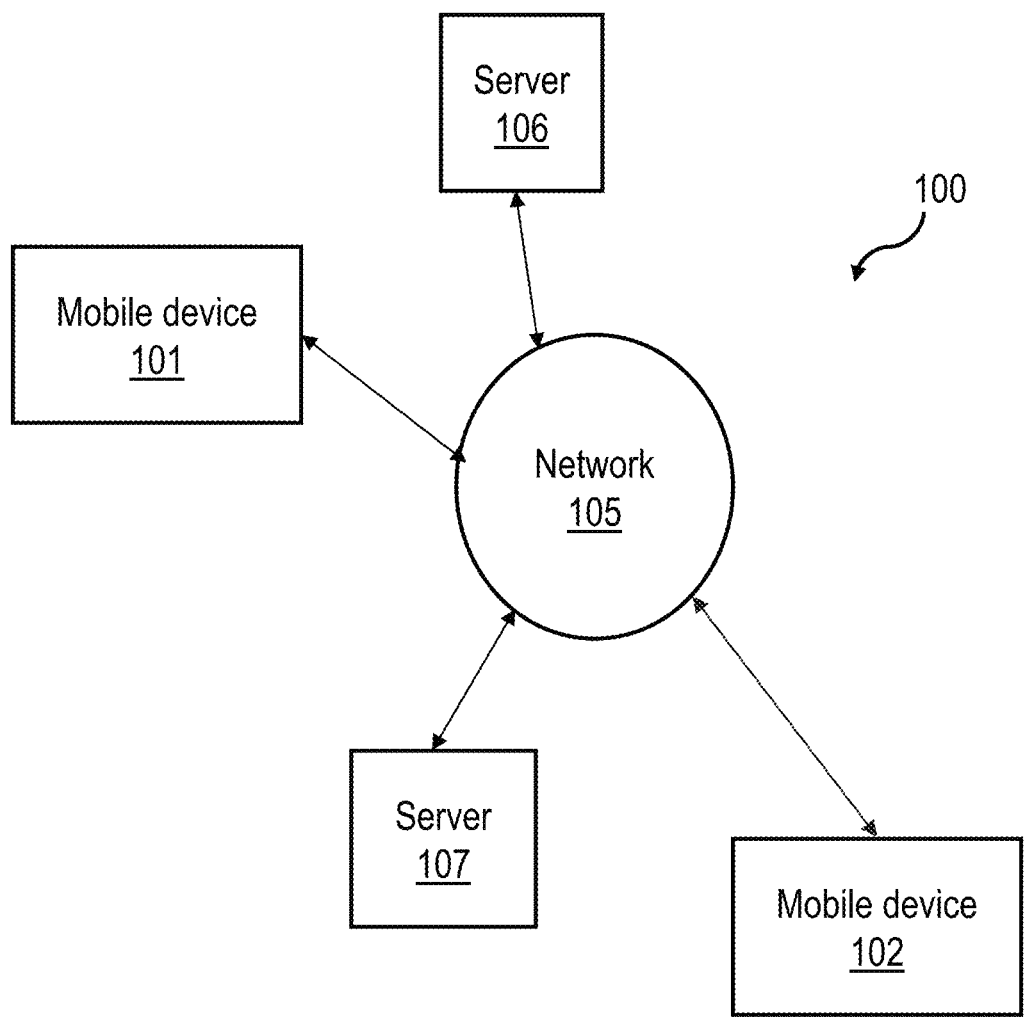
FIG. 1 is a block diagram of an electronic communication environment in which a preferred embodiment of the present invention can be incorporated.

Referring now to the drawings and in particular to FIG. 1, there is illustrated a block diagram of an electronic communication environment in which a preferred embodiment of the present invention can be incorporated. As shown, an electronic communication environment 100 includes multiple mobile devices, such as a first mobile device 101 and a second mobile device 102, capable of communicating with each other electronically by wire and/or wirelessly via a network 105. For example, first mobile device 101 and second mobile device 102 are capable of sending and receiving audio and/or image data to and from each other. In addition, electronic communication environment 100 also includes various data processing systems, such as a server 106 and a server 107, capable of receiving, processing, storing, and sending information among each other and any devices within electronic communication environment 100, such as mobile devices 101, 102 that are connected to network 105.

In various realizations of electronic communication environment 100, network 105 may include, for example, a wireless wide-area network (WAN) including multiple distributed terrestrial, atmospheric and/or satellite-based antennae supporting long range two-way radio frequency communication. Network 105 may alternatively or additionally include one or more circuit-switched and/or packet-switched communication networks, including, for example, the Internet.

Communications among mobile devices 101, 102 and servers 106, 107 may be handled directly by the devices themselves or may be facilitated by a third party platform, such as a communication service provider platform or application service provider platform. Communication service provider platform is a data processing system associated with and/or operated by a network infrastructure or network service company that provides one or more electronic communication services (e.g., Internet, telephony, text messaging, etc.) to one or more of mobile devices 101, 102. Application service provider platform is a data processing system associated with and/or operated by a source or provider of one or more electronic communication applications that can be executed to provide electronic communication between communication endpoints.

In the illustrated embodiment, mobile devices 101, 102 may include a data processing system (such as laptop or tablet), a wearable device (such as smart phone or smart watch), etc. In each of these embodiments, mobile devices 101, 102 include and/or are coupled to a display device, which may be (but is not required to be) a touch-sensitive display device. Mobile devices 101, 102 may optionally include one or more manually manipulable input buttons. Although not required, mobile devices 101, 102 may present within a display device a graphical user interface including one or more icons, each of which may be selected by a user to invoke execution of a corresponding software application via mobile devices 101, 102. For example, a telephone icon corresponds to a voice communication application (which may include video call capability), a messaging icon corresponds to a text messaging application, a browser icon corresponds to a web browser application, and a contacts icon corresponds to a contact management application. As is known in the art, mobile devices 101, 102 may execute multiple of the above-mentioned applications concurrently.

Figure 2:
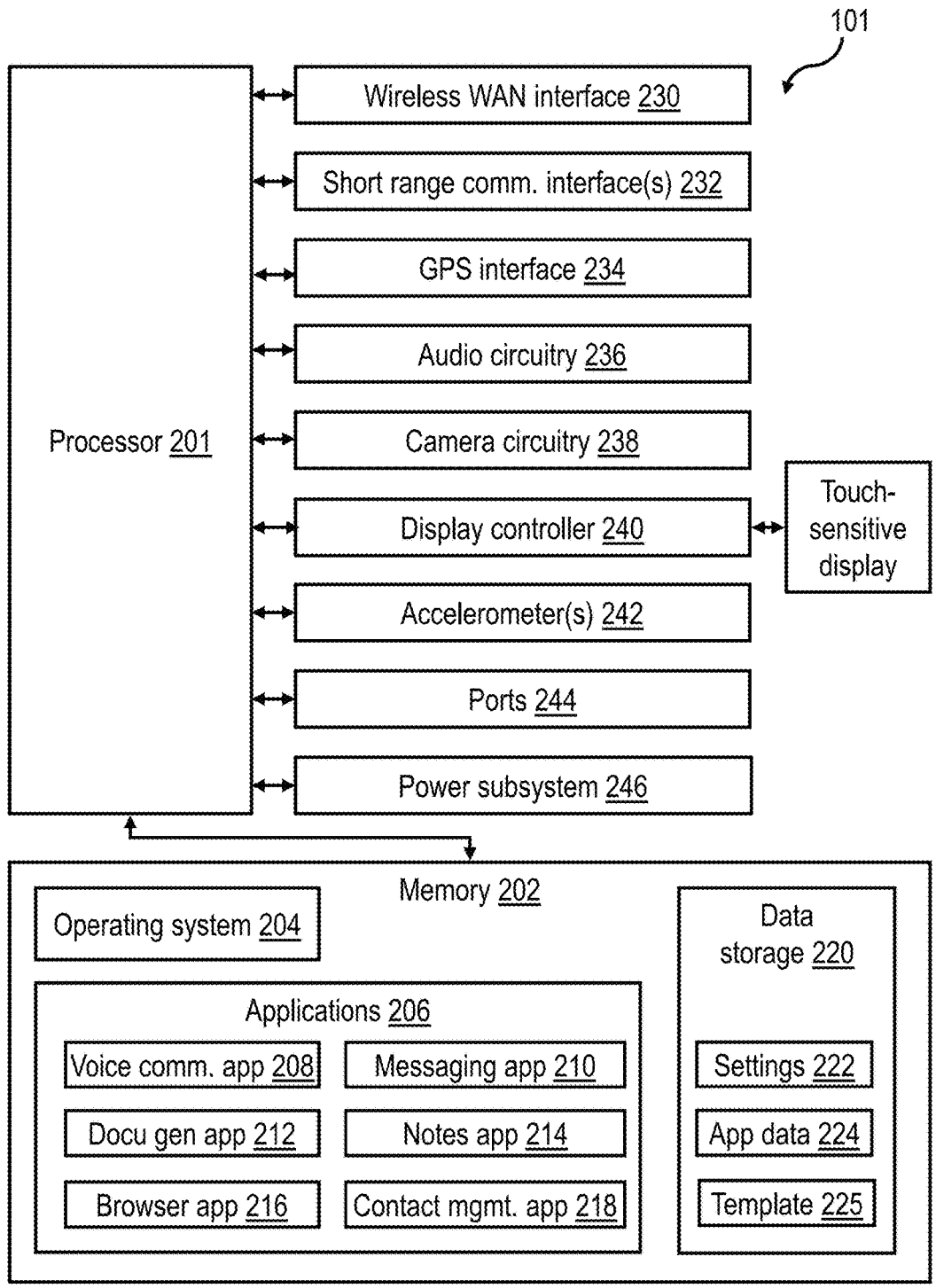
FIG. 2 is a functional block diagram of a mobile device in accordance with one embodiment.

In terms of functionality, mobile devices 101 and 102 are relatively similar to each other, thus, only mobile device 101 will be further described in details. With reference now to FIG. 2, there is depicted a high-level block diagram of mobile device 101 in accordance with one embodiment. As shown, mobile device 101 includes a processor 201, which may include one or more processor cores for executing program code (e.g., software and/or firmware). Processor 201 is coupled, either directly or indirectly, to a variety of different components within mobile device 101. For example, processor 201 is coupled to a memory 202 (e.g., dynamic random access memory, static random access memory, flash memory, and/or magnetic or optical disk drive, etc.) which provides storage for data and program code (e.g., software and/or firmware) executed by processor 201. The program code stored within memory 202 includes an operating system 204 as well as applications (Apps) 206. Apps 206 include, for example, voice communication application 208, messaging (texting) application 210, document generation application 212, notes (text editing) application 214, browser application 216, and contact management application 218.

Data storage 220 of memory 202 may include input data and output data of the processing performed by processor 201. Data accessed and/or processed by applications 206 is referred to herein as application data 224. Data storage 220 may also store settings 222 that control and/or customize the operation of mobile device 101 and/or the program code it executes. 1o Mobile device 101 may include a number of additional components providing, supporting and/or expanding its processing, storage, and/or communication capabilities. For example, mobile device 101 includes a wireless WAN interface 230 (e.g., a transceiver and antenna) supporting two-way wireless radio frequency communication with network 105 (from FIG. 1). In order to support communication with other electronics within close range, mobile device 101 may be further equipped with one or more short range communication interface(s) 232, which may implement protocols for IEEE 802.11x, Bluetooth, 900 MHz communication or the like. Mobile device 101 may further include a global positioning satellite (GPS) interface 234 (e.g., GPS receiver and GPS antenna) that receives GPS signals from GPS satellites and processes the GPS signals to provide location information to processor 201.

Mobile device 101 may also include audio circuitry 236 (e.g., at least an audio interface optionally further coupled to at least one microphone and at least one speaker), camera circuitry 238 and a display controller 240 through which mobile device 101 may present and receive audio and/or image data. Mobile device 101 includes accelerometer(s) 242 as motion sensors, and port(s) 244 that can be utilized to expand the processing, communication and/or data storage capabilities of mobile device 101. In addition, mobile device 101 includes a power subsystem 246 that powers processor 201 and the other components within mobile device 101. Power subsystem 246 may include, for example, a battery and/or power port through which the battery may be charged from an alternating current power source or wireless inductive charging device.

Although FIG. 2 illustrates a number of components separately for ease of understanding, it will be appreciated by those skilled in the art that, in at least some embodiments, multiple of the illustrated components may be integrated within a common integrated circuit chip or package.

Document generation application 212 allows mobile device 101 to be used to as a platform for allowing multiple users to collaboratively create and/or modify an electronic document within electronic communication environment 100 from FIG. 1. The entire portion of document generation application 212 can be stored in mobile device 101 or can be split between mobile device 101 and another data processing system, such as one or more of mobile device 102 or servers 106, 107, within electronic communication environment 100 from FIG. 1.

Figure 3:
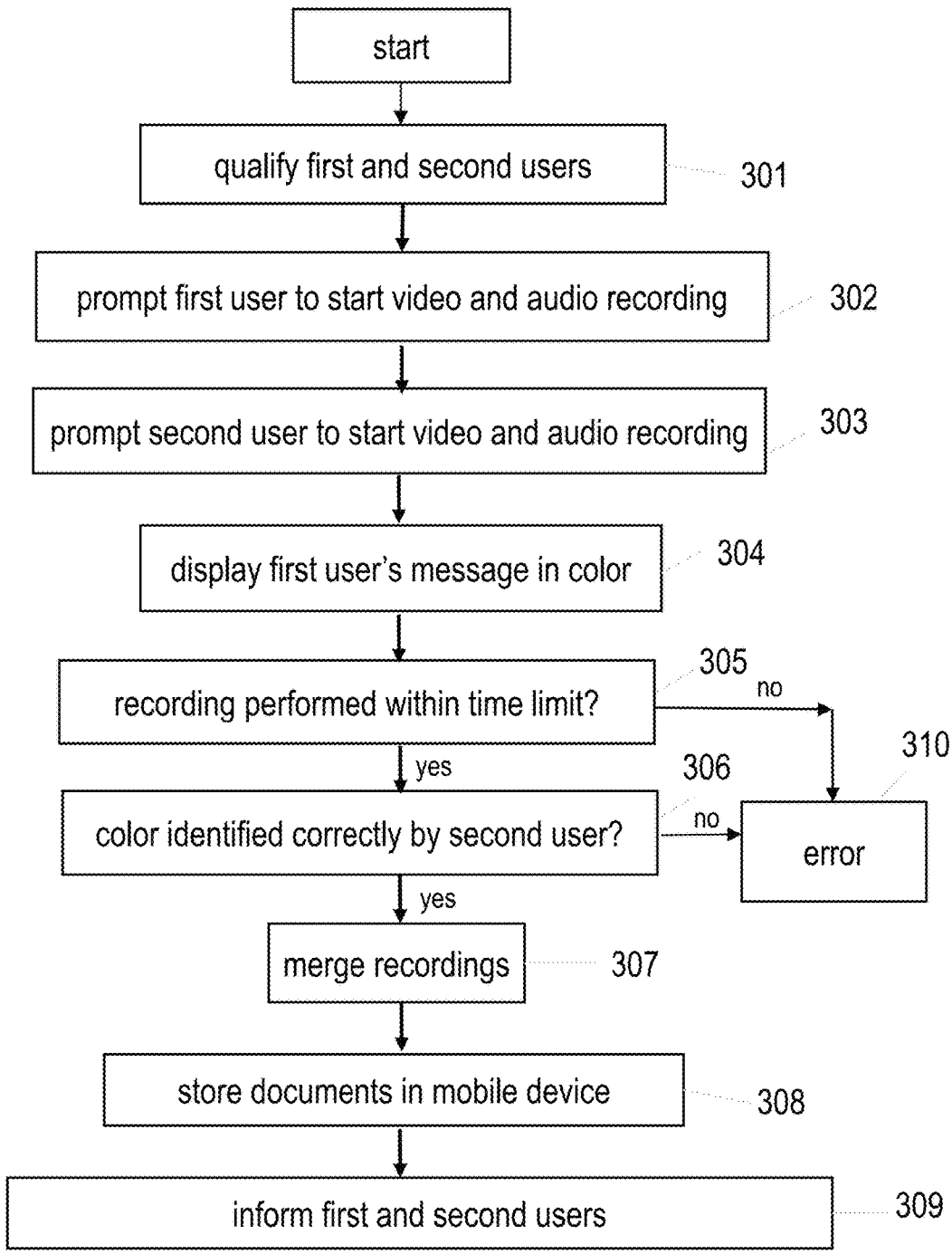
FIG. 3 is a flow diagram of a method for allowing multiple users to collaboratively create and/or modify an electronic document within the environment from FIG. 1, in accordance with one embodiment.

Referring now to FIG. 3, there is depicted a flow diagram of a method for allowing multiple users to collaboratively create and/or modify an electronic document within electronic communication environment 100 from FIG. 1, in accordance with one embodiment. In at least one embodiment, the illustrated process is performed through an execution of document generation application 212 on a mobile device such as mobile device 101. It should be appreciated that in various embodiments, one or more of the illustrated steps can be preformed in an alternative order or concurrently.

Initially, a first user and a second user of an electronic document are qualified, as shown in block 301. The details of the qualification process will be further explained in FIG. 4. After the qualification process has been completed, the first user is prompted to start video and/or audio recording on the mobile device to capture specific information of the electronic document to be utilized by the first user and the second user, as depicted in block 302. A message template (from template 225 in FIG. 2) can be displayed on the mobile device to assist the first user with the specific terms of the electronic document. For example, the following message can be displayed on the mobile device to allow the first user to read from:

"I, _____(state your name)_____, agree to _____(state what you are agreeing to do with the other person)_____ with _____(state the other person's name)_____."

After the first user has completed the video and/or audio recording on the mobile device, the audio recording can be converted to a textual message for the first user to review and edit, if necessary.

Next, the second user is prompted to start video and/or audio recording on the mobile device to capture specific information of the electronic document from the second user, as shown in block 303. In order to assist the second user, the textual message that had already been reviewed by the first user will be displayed in a certain color (other than the default text color) or other distinct text characteristic (such as highlighting, underlining, italics, bold face, etc.) on the mobile device, as depicted in block 304. The non-black color can be chosen randomly by the App such that it will be different each time. In conjunction, a message template will be displayed on the mobile device to assist the second user with the specific terms of the electronic document. For example, the following message can be displayed on the mobile device to allow the second user to read from:

"I, _____(state your name)_____, agree to the statement displayed in _____(state the color)_____ in the text message."

In order to assist the second user with the correct identification of the color of the statement, a textual hint, such as "the statement color is brown" can be displayed with the textual message.

Alternatively, the following black-colored message can be displayed on the mobile device to allow the second user to read from:

"I, _____(state your name)_____, agree to _____(state what you are agreeing to do with the other person)_____ with _____(state the other person's name)_____."

After the second user has been prompted to start video and/or audio recording on the mobile device, the second user needs to start and/or complete the recording within a predetermined time interval. For example, a countdown timer can be displayed on the mobile device to allow the second user to recognize the time limit. In various implementations, the time interval can be measured from the beginning or end of the first recording or end of the second recording. Subsequently, a determination is made whether or not the two recordings (from the first and second users) were performed within a predetermined time interval, as shown in block 305. For example, the predetermined time interval can be five minutes. If the two recordings do not satisfy the predetermined time interval, an error message will be displayed on the mobile device, as depicted in block 310.

Otherwise, if the two recordings satisfy the predetermined time interval, then another determination is made whether or not the second user had correctly identified the color (or other text characteristic) of the statement previously recorded by the first user, as depicted in block 306 (this determination can be skipped if the black-colored message is employed). If the second user did not correctly identify the color of the statement previously recorded by the first user, an error message will be displayed on the mobile device, as depicted in block 310.

Otherwise, if the color (or other text characteristic) of the statement had been correctly identified by the second user, the two video and/or audio recordings are then merged into one media document, as shown in block 307. In addition, the audio recordings of the second user can be converted into text and appended to the textual message of the first user to form an electronic text document.

Next, the media document and/or the electronic text document are generated and stored in the mobile device, as depicted in block 308, and a textual or audio confirmation is presented by the mobile device to inform the two users that the media document and/or the electronic text document have been generated and stored in the mobile device, as shown in block 309. Optionally, a second copy of the media document and/or electronic text document can be sent to the second user's mobile device (such as mobile device 102 from FIG. 1) via, for example, an email or text message, and/or a third copy of the media document and/or electronic text document can be stored in a document repository (such as servers 106, 107 from FIG. 1).

Figure 4:
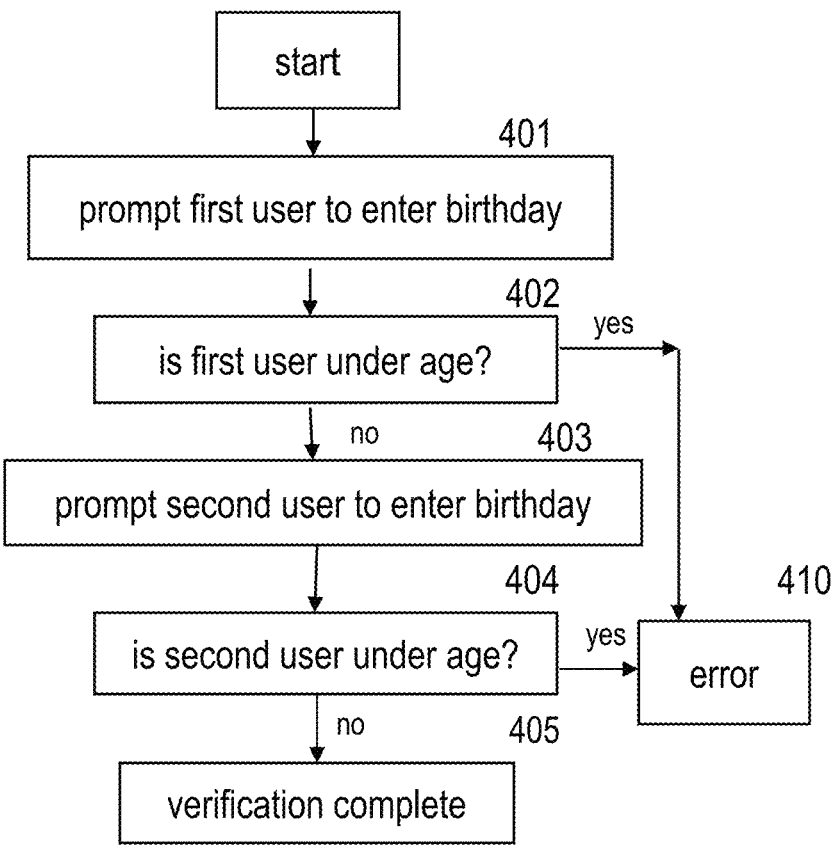
FIG. 4 is a flow diagram of a method for qualifying users of the electronic document of FIG. 3, in accordance with one embodiment.

With reference now to FIG. 4, there is depicted a flow diagram of a method for qualifying users of the electronic document from FIG. 3, in accordance with one embodiment. After a first user has initiated an App on a mobile device, the first user is prompted to enter his/her birthday on the mobile device, as shown in block 401.

A determination is made whether or not the first user is under a predetermined age (e.g., 18 years old), as depicted in block 402. If the first user is under age, an error message will be displayed on the mobile device, as shown in block 410. Otherwise, if the first user is of age, the second user is then prompted to enter his/her birthday on the mobile device, as shown in block 403.

A determination is made whether or not the second user is under a predetermined age (e.g., 18 years old), as depicted in block 404. If the second user is under age, an error message will be displayed on the mobile device, as shown in block 410. Otherwise, if the second user is of age, the qualification process is completed, as depicted in block 405.

Alternatively, instead of soliciting birthday information from users each time when the App is invoked, the birthday information of a user can be previously captured and stored in a database along with the username if the user is a registered user of the App.

Figure 5:
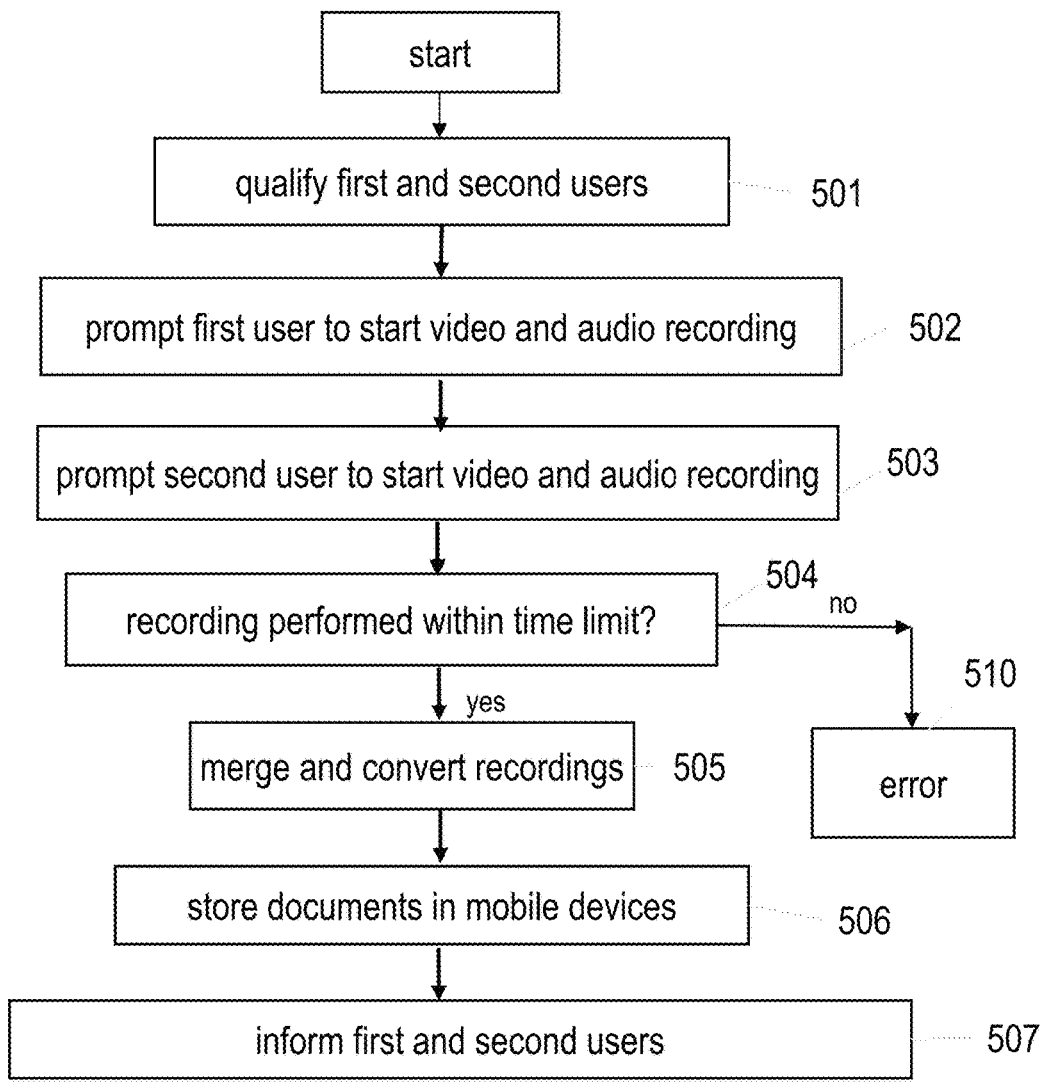
FIG. 5 is a flow diagram of a method for allowing multiple users to collaboratively create and/or modify an electronic document within the environment from FIG. 1, in accordance with an alternative embodiment.

When the first and second users are relatively far each other, it would be more convenient for each of the two users to use a separate mobile device to perform document collaboration. Referring now to FIG. 5, there is depicted a flow diagram of a method for allowing multiple users to collaboratively create and/or modify an electronic document within environment 100 from FIG. 1, in accordance with an alternative embodiment, when document generation application 112 are invoked by multiple users. Initially, a first user and a second user of the electronic document are qualified, as shown in block 501. The qualification process will be similar to the steps detailed in FIG. 4, except that each user will perform the qualification on a respective one of two separate mobile devices.

After the qualification process has been completed, the first user is prompted to start video and/or audio recording on the first user's mobile device, such as first mobile device 101 from FIG. 1, to capture specific information of the electronic document to be utilized by the first user and the second user, as depicted in block 502. A message template can be displayed on the first user's mobile device to assist the first user with the specific terms of the electronic document. For example, the following message can be displayed on the first mobile device to allow the first user to read from:

"I, _____(state your name)_____, agree to _____(state what you are agreeing to do with the other person)_____ with _____(state the other person's name)_____."

After the first user has completed the video and/or audio recording on the first user's mobile device, the audio recording can be converted to a textual message for the first user to review and edit, if necessary. The textual message is then sent via network 105 to the second user's mobile device, such as second mobile device 102 from FIG. 1.

At this point, the second user is prompted to start video and/or audio recording on the second user's mobile device to capture specific information from the second user, as shown in block 503. A message template can be displayed on the second user's mobile device to assist the second user with the specific terms of the electronic document. For example, the following message can be displayed on the mobile device to allow the second user to read from:

"I, _____(state your name)_____, agree to _____(state what you are agreeing to do with the other person)_____ with _____(state the other person's name)_____."

After the second user has been prompted to start video and audio recording on the mobile device, the second user needs to start and/or complete the recording within a predetermined time interval. For example, a countdown timer can be displayed on the mobile device to allow the second user to recognize the time limit. Subsequently, a determination is made whether or not the two recordings (from the first and second users) satisfy a predetermined time interval, as depicted in block 504. For example, the predetermined time interval can be five minutes. If the two recordings do not satisfy the predetermined time interval, an error message will be displayed on the mobile device, as depicted in block 510.

Otherwise, if the two recordings satisfy the predetermined time interval, then the two video/audio recordings are merged into one media document, and the audio recordings are converted into textual format to form an electronic text document, as shown in block 505. Next, the media document and the electronic text document are separately stored in the first and second mobile devices, as depicted in block 506.

Finally, a textual and/or audio confirmation is presented by each user's mobile device to inform the respective users that an electronic document has been generated for the two users, as shown in block 507. At this point, both the first and second users will have the same electronic text document and electronic media document stored in their respective mobile devices. Optionally, a third copy of the electronic text document and/or media document can be stored in a separate location such as a document repository (such as servers 106, 107 from FIG. 1).

As has been described, the present invention provides a method for allowing multiple users to collaborate on a variety of electronic documents.

For the purpose of the present disclosure, a storage device is defined as statutory article of manufacture, and not any transitory storage medium.

While the invention has been particularly shown and described with reference to a preferred embodiment, it will be understood by those skilled in the art that various changes in form and detail may be made therein without departing from the spirit and scope to of the invention.

What is claimed is:

1. A mobile device comprising:
   a display;
   an input device;
   a processor configured to perform:
      presenting a first message on said display to prompt a first user to start to record at least one of audio and video information via said input device on said mobile device,
      presenting, after said first user has completed said recording of said at least one of audio and video information on said mobile device, a second message on said display to prompt a second user to start to record at least one of audio and video information via said input device on said mobile device,
      determining, after said second user has completed said recording of said at least one of audio and video information on said mobile device, whether or not said two recordings satisfy a predetermined time interval requirement, and
      merging, in response to a determination that said two recordings satisfy a predetermined time interval requirement, said two recordings into one media document; and
   a storage device for storing said media document in said mobile device.

2. The mobile device of claim 1, wherein said processor is further configured to perform converting said audio recordings into a textual document.

3. The mobile device of claim 1, wherein said display displays a content template to assist one of said first and second users to provide a statement.

4. The mobile device of claim 1, wherein said display displays said first user's statement in text having a distinctive characteristic.

5. The mobile device of claim 4, wherein said processor further configured to perform
   determining whether or not said second user had correctly identified said distinctive characteristic, and
   presenting an error message in response to a determination that said second user did not correctly identify said distinctive characteristic.

6. A non-transitory computer-readable storage device having computer program product, said non-transitory computer-readable storage device comprising:
   program code for presenting a first message on a display on at least one mobile device to prompt a first user to start record via an input device on said at least one mobile device at least one of audio and video information of said first user;
   program code for, after said first user has completed said at least one of audio and video recording on said at least one mobile device, presenting a second message on said a display of said at least one mobile device to prompt a second user to start to record via an input device on said at least one mobile device at least one of audio and video information of said second user;
   program code for determining, after said second user has completed said at least one of audio and video recording on said at least one mobile device, whether or not said two recordings satisfy a predetermined time interval requirement;
   program code for, in response to a determination that said two recordings satisfy within a predetermined time interval requirement, merging said two recordings into one media document; and
   program code for storing said media document in a storage device within said at least one mobile device.

7. The non-transitory computer-readable storage device of claim 6, wherein said storage device further includes program code for, after successful qualification of said first user and said second user, prompting said first user to start recording via said at least one mobile device.

8. The non-transitory computer-readable storage device of claim 6, wherein said storage device further includes program code for converting said audio recordings into a textual document.

9. The non-transitory computer-readable storage device of claim 6, wherein said storage device further includes program code for displaying a statement from said first user utilizing a distinctive characteristic.

10. The non-transitory computer-readable storage device of claim 9, wherein said storage device further includes
   program code for determining whether or not said second user had correctly identified said distinctive characteristic;
   program code for, in response to a determination that said second user did not correctly identify said distinctive characteristic, displaying an error message.

11. A method comprising:
   presenting a first message on a display on at least one mobile device to prompt a first user to start to record via an input device on said at least one mobile device at least one of audio and video information of said first user;
   after said first user has completed said at least one of audio and video recording on said at least one mobile device, presenting a second message on said a display of said at least one mobile device to prompt a second user to start to record via an input device on said at least one mobile device at least one of audio and video information of said second user;
   determining after said second user has completed said at least one of audio and video recording on said at least one mobile device, whether or not said two recordings satisfy a predetermined time interval requirement;

in response to a determination that said two recordings satisfy within a predetermined time interval requirement, merging said two recordings into one media document; and storing said media document in a storage device within said at least one mobile device.

12. The method of claim 11, wherein said method further includes after successful qualification of a first user and a second user, prompting said first user to start recording via said at least one mobile device.

13. The method of claim 11, wherein said method further includes converting said audio recordings into a textual document.

14. The method of claim 11, wherein said method further includes displaying a statement from said first user utilizing a distinctive characteristic.

15. The method of claim 14, wherein said method further includes determining whether or not said second user had correctly identified said distinctive characteristic;

in response to a determination that said second user did not correctly identify said distinctive characteristic, displaying an error message.

16. A method comprising:

after successful qualification of a first user and a second user of an electronic document, presenting a first message on said first user's mobile device to prompt said first user to start video and audio recording on said first user's mobile device to capture information of said electronic document;

after said first user has completed said video and audio recording on said first user's mobile phone, presenting a second message on said second user's mobile device to prompt said second user to start video and audio recording on said second user's mobile device to capture information of said electronic document;

determining whether or not said two video/audio recordings were performed within a predetermined time from each other;

in a determination that said two recordings were performed within a predetermined time from each other, merging said two video/audio recordings into one media document;

converting said audio recordings into a text document; and storing said media and text documents in said first user's mobile device and said second user's mobile device.

* * * * *